B. STECHBART.
MOTION PICTURE MACHINE.
APPLICATION FILED FEB. 5, 1918.
1,287,500.
Patented Dec. 10, 1918.
2 SHEETS—SHEET 1.
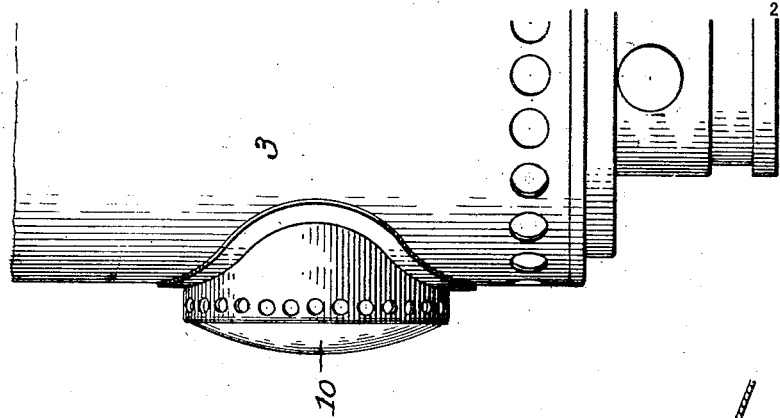
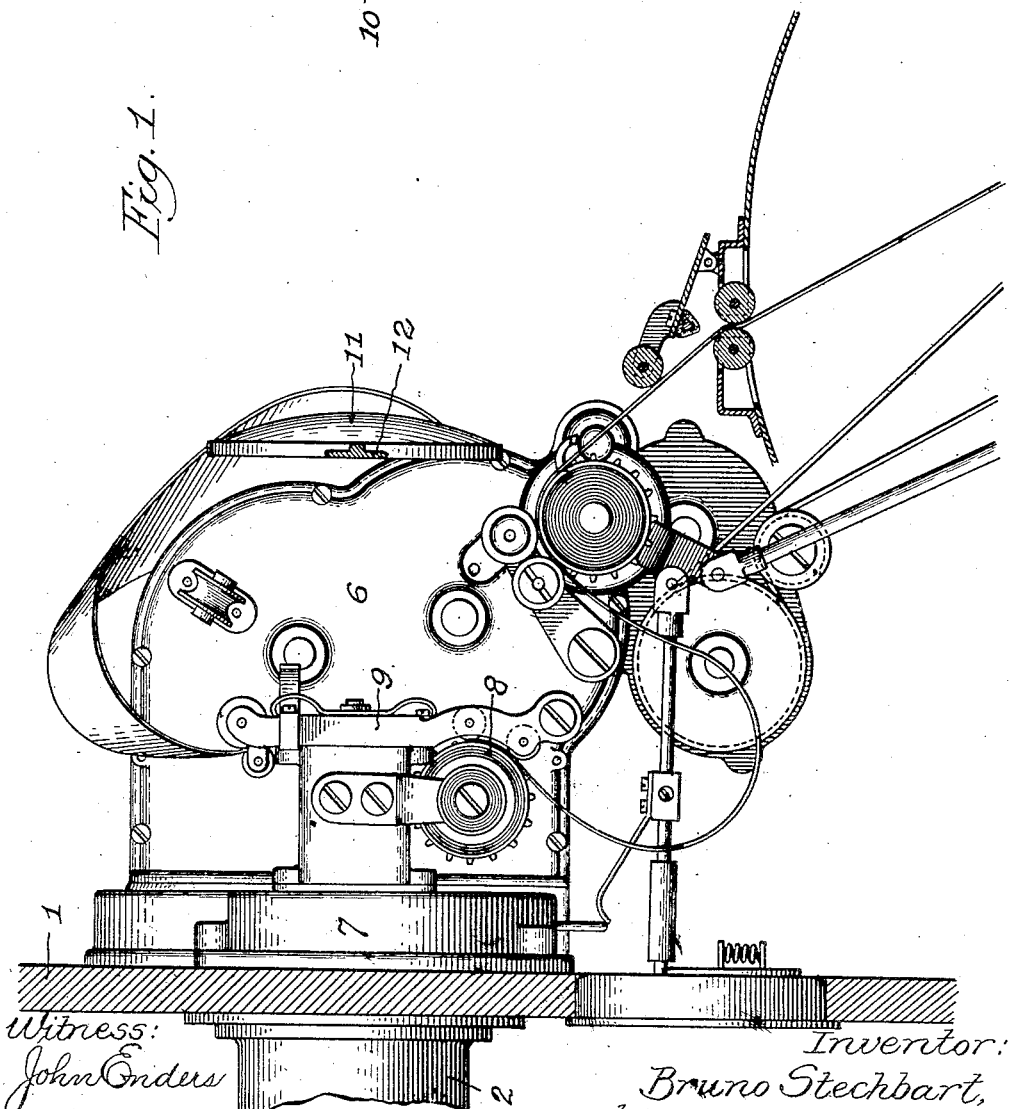
Witness:
John Enders
Inventor:
Bruno Stechbart,
by Robert Burns
Atty.

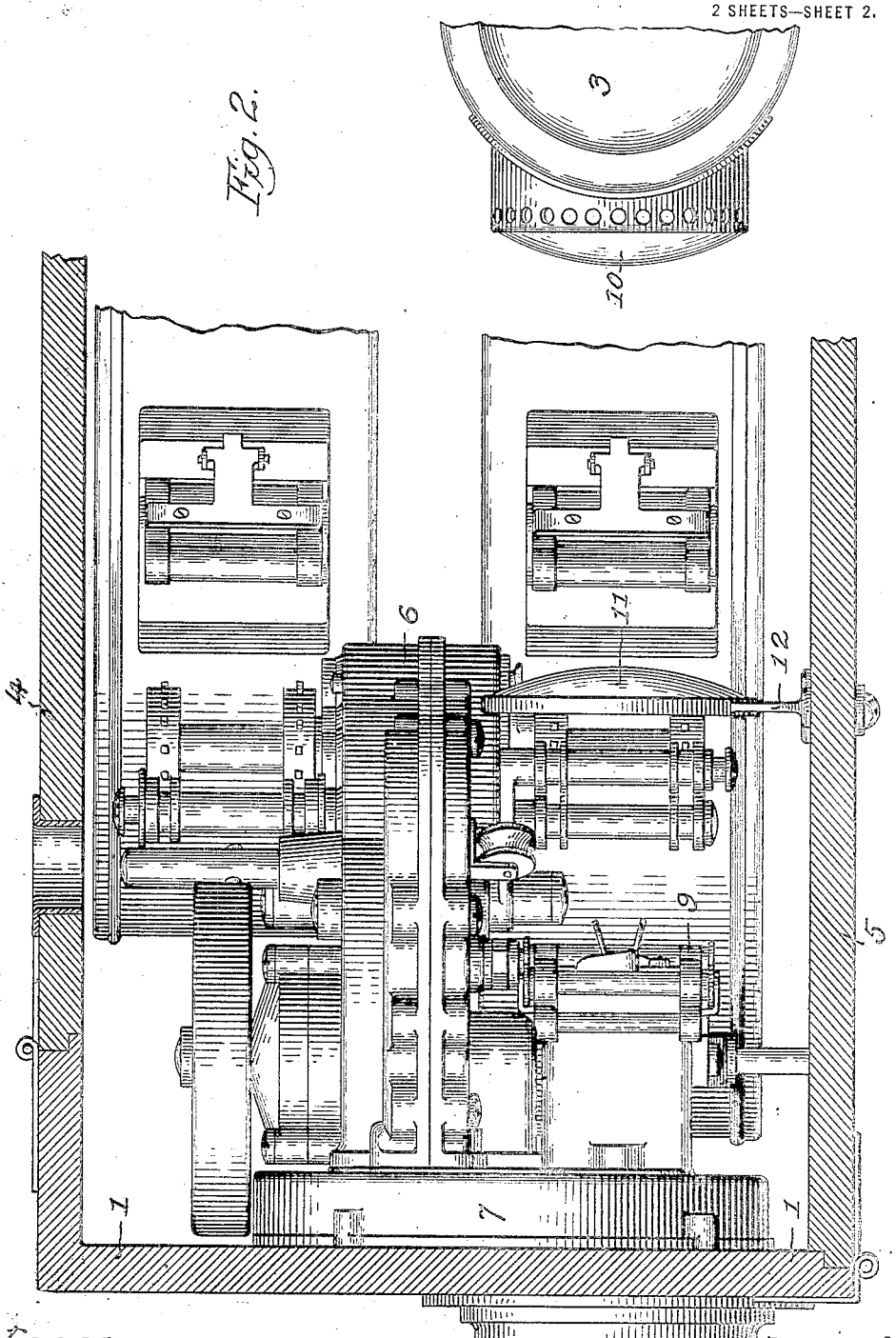

UNITED STATES PATENT OFFICE.

BRUNO STECHBART, OF CHICAGO, ILLINOIS, ASSIGNOR, BY MESNE ASSIGNMENTS, TO AMERICAN PROJECTING COMPANY, OF CHICAGO, ILLINOIS, A CORPORATION OF DELAWARE.

MOTION-PICTURE MACHINE.

1,287,500.      Specification of Letters Patent.      Patented Dec. 10, 1918.

Original application filed May 7, 1917, Serial No. 166,865. Divided and this application filed February 5, 1918. Serial No. 215,448.

*To all whom it may concern:*

Be it known that I, BRUNO STECHBART, a citizen of the United States of America, and a resident of Chicago, in the county of Cook, State of Illinois, have invented certain new and useful Improvements in Motion-Picture Machines, of which the following is a specification.

This invention relates to the type of portable motion picture machines described in detail in my prior application for Letters Patent, Serial No. 166,865, filed May 7, 1917, whereof the present application is a division.

The object of the present improvement is to provide a simple and efficient structural arrangement and combination of the film feeding mechanism and a lens member of the condenser of a motion picture machine, affording close and effective illumination at the light or film aperture of the machine, and in which such lens member is automatically moved to one side during the operation of replacing, etc., the film in the film feeding mechanism, all as will hereinafter more fully appear.

In the accompanying drawings:—

Figure 1, is a detail vertical section of a portable motion picture machine having the present improvement applied.

Fig. 2 is a plan view, with the inclosing casing in section.

Like reference numerals indicate like parts in both views.

Referring to the drawings, 1 designates a box or casing, preferably of the rectangular form shown, and adapted to inclose the film feeding, film guiding and film reeling mechanisms of a motion picture machine, and afford a support for the usual projection objective 2, lamp house 3 and condenser usually associated with the aforesaid mechanisms. With a view to afford convenient access to the mechanisms aforesaid, the main portions of the respective side walls of the casing 1 are hinged to the other portion of said casing to constitute entry doors 4 and 5 to the interior of the casing and parts and mechanisms contained therein in the various operations of the machine in actual use.

6 designates the supporting frame or casing for the film feeding and guiding mechanisms above referred to, and preferably of the closed shell form shown in the drawings, and having spaced vertical walls formed with journal orifices for the shafts of the different rotary members of said mechanisms. The frame or casing 6 is secured to the front wall of the casing or box 1 aforesaid; and near its forward end the frame or casing 6 is provided with a transversely enlarged shell or casing 7 adapted to contain the bladed light shutter of the machine.

8 designates the intermittent film feeding sprocket drum of the film feeding mechanism aforesaid, and 9 designates the hinged gate for confining the passing picture film in proper relation to the usual light aperture of the casing 6 aforesaid.

The lamp house 3 heretofore referred to carries the usual primary lens member or members 10 of the condenser systems of the machine, and in connection therewith the present improvement involves a structural formation and arrangement of parts as follows:—

11 designates a secondary lens member carried by a transversely arranged bracket support 12 attached to the hinged door 5 of the main casing 1, as shown in Fig. 2. As so arranged the secondary lens member 11 is adapted to swing away from the film feeding and other mechanisms with which it is ordinarily associated, as the door 5 is opened to afford access to the film mechanisms aforesaid. With the described arrangement it is practical to have the lens member 11 occupy a space immediately back of the film gate 9 aforesaid, and thus aid in the attainment of a compact structure in the complete machine.

Having thus fully described my said invention, what I claim as new and desire to secure by Letters Patent, is:—

1. In a motion picture machine, the combination of a casing or support, a film guiding and feeding mechanism fixedly associated therewith, a condenser lens member having close operative relation to said mechanism, a holder for said lens mounted movably in relation to said mechanism so that the holder and lens may be moved away from said mechanism to give free access to the same, substantially as set forth.

2. In a motion picture machine, the combination of a casing or support, a film guiding and feeding mechanism fixedly associated therewith, a condenser lens member having close operative relation to said mechanism, a holder for said lens mounted in a pivotal manner in relation to said mechanism so that the holder lens may be swung away from said mechanism to give free access to the same, substantially as set forth.

3. In a motion picture machine, the combination of a casing having a hinged door, a film feeding and guiding mechanism arranged in the interior of said casing, and a condenser lens member carried on said door and having close operative relation to the film feeding and guiding mechanism aforesaid, substantially as set forth.

Signed at Chicago, Illinois, this 1st day of February, 1918.

BRUNO STECHBART.